United States Patent [19]

Kobayashi

[11] Patent Number: 4,640,097
[45] Date of Patent: Feb. 3, 1987

[54] BRAKE BOOSTER
[75] Inventor: Michio Kobayashi, Higashimatsuyama, Japan
[73] Assignee: Jidosha Kiki Co. Ltd., Japan
[21] Appl. No.: 615,455
[22] Filed: May 30, 1984
[30] Foreign Application Priority Data Jun. 2, 1983 [JP] Japan ................................. 58-98571

[51] Int. Cl.$^4$ .............................................. B60T 13/20
[52] U.S. Cl. .................................. 60/554; 91/369 A; 91/450; 92/82; 92/168
[58] Field of Search ............. 91/369 R, 369 A, 376 R, 91/6, 450; 60/547.1, 554; 92/169.2, 169.3, 169.4, 82, 168 B

[56] References Cited
U.S. PATENT DOCUMENTS 3,350,882 11/1967 Leising ............................... 91/369 R
3,362,298 1/1968 Julow ................................ 60/547.1
3,543,298 11/1970 Rockwell ........................ 91/369 A
4,428,274 1/1984 Takeuchi ........................ 91/369 A
4,434,619 3/1984 Kobayashi ........................ 60/547.1
4,450,688 5/1984 Boehm ............................... 60/547.1
4,499,812 2/1985 Pressaco ........................ 91/376 R Primary Examiner—Abraham Hershkovitz
Attorney, Agent, or Firm—McGlew and Tuttle

[57] ABSTRACT

A brake booster having a constant pressure chamber and a variable pressure chamber formed respectively at both front and rear sides of a power piston within a housing, characterized in that a hollow expansion body expansible axially of the power piston is disposed within the constant pressure chamber and one end of the hollow expansion body is secured fixedly to the housing while the other end of the expansion body is connected to a push rod so that the force magnifying ratio of the brake booster is varied by adjusting the internal pressure in the hollow expansion body.

8 Claims, 10 Drawing Figures 4,640,097

BRAKE BOOSTER

BACKGROUND OF THE INVENTION (i) Field of the Invention:

This invention relates to a brake booster which is to vary a force magnifying ratio if necessary.

(ii) Description of Prior Art:

Prior brake boosters have a constant force magnifying ratio. Thus, when vehicle weight is varied by the movable load or the like of the vehicle and the pedalling force of a brake pedal is constant, the braking distance of the vehicle is necessarily varied under braking from the same speed of the vehicle. Hence, in the vehicle provided with the prior brake booster, the pedalling force of the brake pedal needs to be increased properly according to the movable load so as to provide a predetermined braking distance. However, considerable experiences are needed for such proper operation and the increase of the pedalling force of the brake pedal causes the fatigue of a driver.

OUTLINE OF THE INVENTION

An object of the present invention is to provide a brake booster which is to vary the force magnifying ratio if necessary.

The present invention is summarized in that, in a brake booster having a constant pressure chamber and a variable pressure chamber formed respectively at both front and rear sides of a power piston within a housing, a hollow expansion body expansible axially of said power piston is disposed in said constant pressure chamber and one end of said hollow expansion body is secured fixedly to said housing while the other end is connected to a push rod so that the force magnifying ratio of said brake booster is varied by adjusting the internal pressure in said hollow expansion body.

Further objects and advantages of the present invention will be apparent from the following description.

BRIEF DESCRIPTION OF THE DRAWINGS

FIGS. 1 to 3 show a first embodiment of the present invention, in which:

FIG. 1 is a longitudinal cross-sectional view showing a brake booster and a change-over device of force magnifying ratio;

FIG. 2 is a longitudinal cross-sectional view showing the change-over device in low force magnifying ratio; and FIG. 3 is a longitudinal cross-sectional view showing the change-over device in high force magnifying ratio;

FIGS. 5 to 8 show a second embodiment of the present invention, in which:

FIG. 5 is a longitudinal cross-sectional view showing the operational condition of the brake booster and a pressure regulator; and FIGS. 6 to 8 are longitudinal cross-sectional views showing the operational conditions of the pressure regulators.

DETAILED DESCRIPTION OF THE INVENTION

Figure 1:
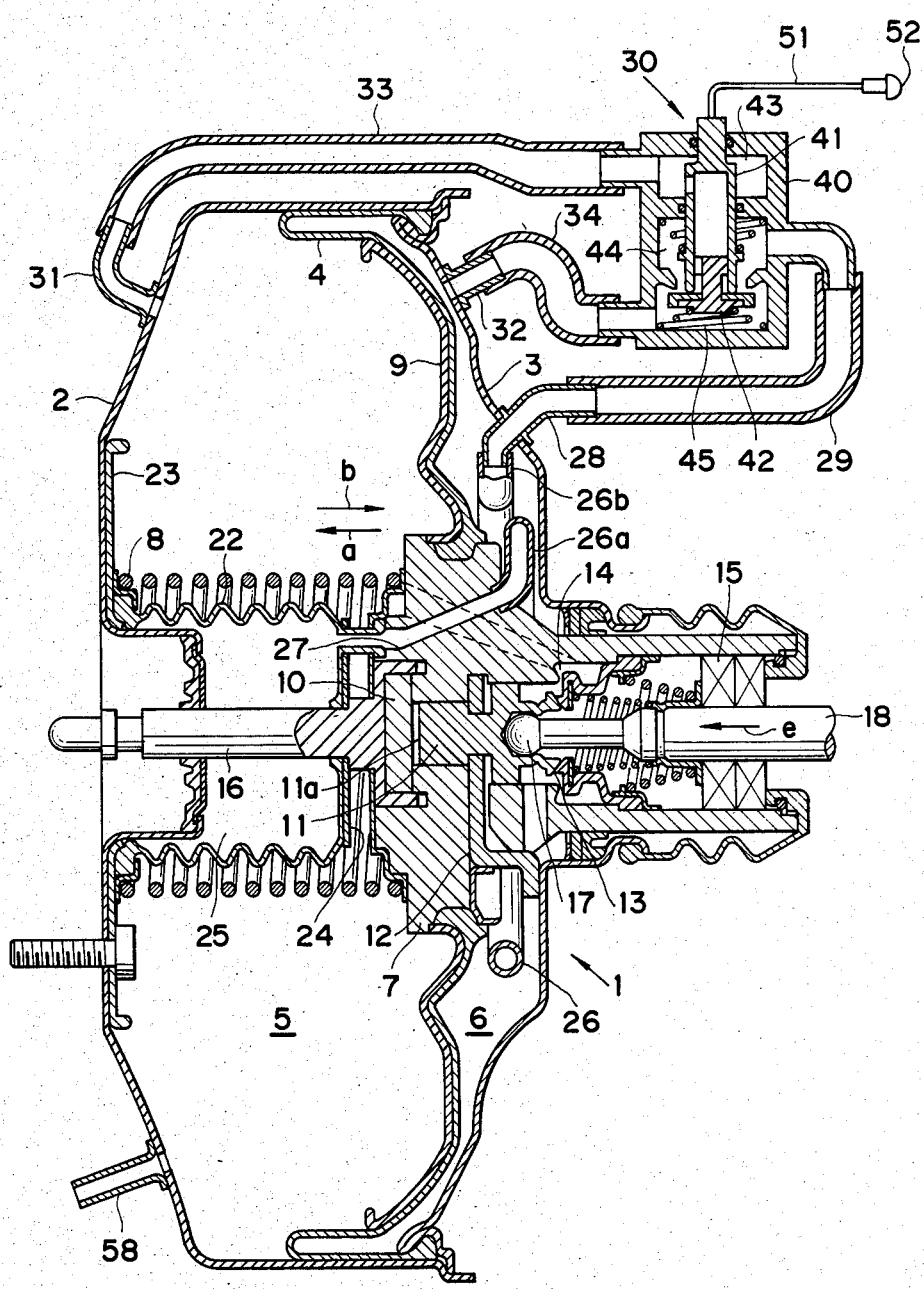

Hereinafter will be described the embodiments of the present invention with reference to drawings. First will be described the first embodiment of the present invention with reference to FIGS. 1 to 3. FIG. 1 is a longitudinal cross-sectional view showing a brake booster 1. As shown in said drawings, the brake booster 1 has a pair of front and rear housings 2, 3, the outer peripheries of which are coupled with each other with the outer periphery of a rubber diaphragm 4 being inserted between them. And an air-tight constant pressure chamber 5 and an air-tight variable pressure chamber 6 are formed respectively at both left and right sides of the diaphragm 4.

The inner periphery of the diaphragm 4 is secured fixedly to the outer periphery of a power piston 7 so that the power piston 7 is moved forward in the direction of arrow a in FIG. 1 by the transformation of the diaphragm 4 caused by differential pressure between the constant pressure chamber 5 and the variable pressure chamber 6. Also, a return spring 8 is disposed between the power piston 7 and the housing 2 so that the power piston 7 is moved backward in the direction of arrow b in FIG. 1 by the stability of the return spring 8. Further, the constant pressure chamber 5 side surface of the diaphragm 4 is supported by a diaphragm plate 9.

Within the power piston 7 are disposed respectively a rubber reaction disk 10, a relay rod 11, a stopper plate 12, an atmospheric valve 13, a vacuum valve 14 and an air filter 15. Said reaction disk 10 is disposed between the base end of a push rod 16 and the relay rod 11. Also, the relay rod 11 is connected to a control rod 18 through a spherical articulated joint 17. Thus, reaction corresponding to braking force is transmitted from the push rod 16 to the control rod 18.

Around the push rod 16 in the constant pressure chamber 5 is arranged a hollow expansion body 22 constituted from a flexible bellows. This expansion body 22 is expansible axially of the power piston 7 and one end of the expansion body 22 is secured fixedly to the inside wall of the housing 2 in the air-tight manner, sandwiching a plate 23 between itself and said wall. The other end of said body 22 is secured fixedly to the base end of the push rod 16 in the air-tight manner while it is supported by a support plate 24. And an air-tight bellows chamber 25 is formed inside the hollow expansion body 22.

On the other hand, a spiral pipe 26 having elasticity is disposed around the power piston 7 in the variable pressure chamber 6. One end 26a of the spiral pipe 26 at the inner peripheral side is connected to the bellows chamber 25 through a communicating hole 27 formed in the interior of the power piston 7. Also, the other end 26b of the spiral pipe 26 at the outer peripheral side is connected to a change-over device 30 outside the brake booster 1 through a connecting pipe 28 mounted on the housing 3 and a connecting tube 29.

Also, the constant pressure chamber 5 and the variable pressure chamber 6 are connected to the change-over device 30 through connecting pipes 31, 32 and connecting tubes 33, 34 mounted respectively on the housing 2, 3.

Figure 2:
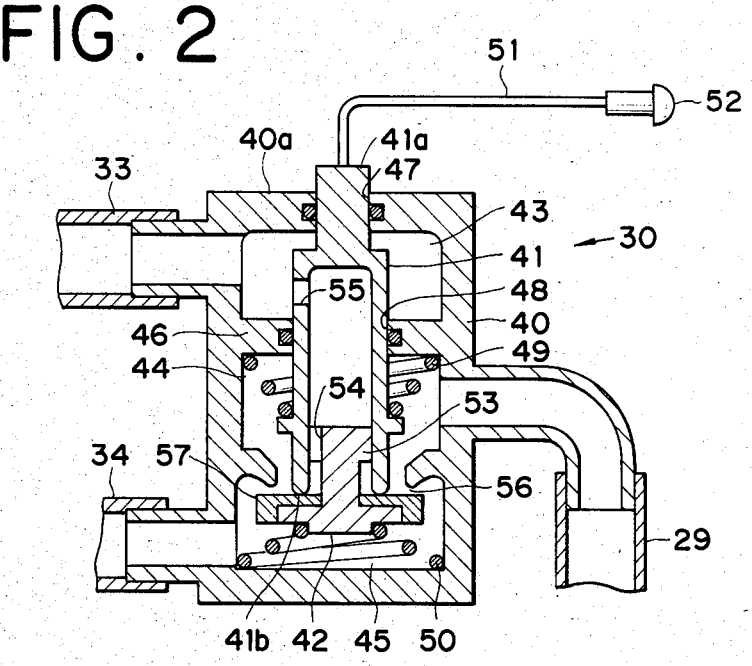
Figure 3:
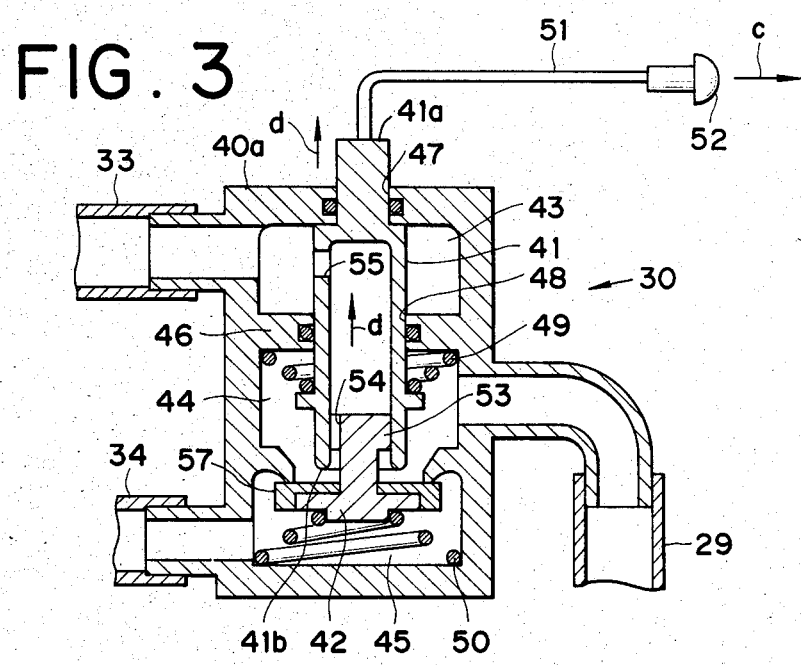

Said change-over device 30 is constituted from a cylindrical housing 40, a slide sleeve 41 and a valve body 42 as particularly shown in FIGS. 2 and 3. Inside the housing 40 are respectively formed a negative pressure introducing chamber 43 communicating to the constant pressure chamber 5 through said connecting tube 33, a change-over chamber 44 communicating to the bellows chamber 25 through the connecting tube 29 and a valve chamber 45 communicating to the variable pressure chamber 6 through the connecting tube 34.

Said negative pressure introducing chamber 43 is separated from the change-over chamber 44 by a partition wall 46 in the air-tight manner. The slide sleeve 41 is slidably inserted into insertion holes 47, 48 formed respectively in an end wall 40a and the partition wall 46 of the housing 40, and urged by a spring 49 normally toward the valve chamber 45 side. Also, the valve body 42 is housed in the valve chamber 45 and urged by a spring 50 normally toward the change-over chamber 44 side.

To one end 41a of the slide sleeve 41 projecting outside the housing 40 is connected one end of a wire 51 and the other end of the wire 51 is extended to a driver's seat in the vehicle. And as shown in FIG. 3, when a knob 52 mounted on the other end of the wire 51 is pulled in the direction of arrow c, the slide sleeve 41 slides in the direction of arrow d in FIG. 3.

On the other hand, an opening portion 41b at the other end of the slide sleeve 41 extends to the proximity of intermediate portion between the change-over chamber 44 and the valve chamber 45. And a guided portion 53 projecting from the central portion of the valve body 42 is slidably inserted into this opening portion 41b. This guided portion 53 is formed on the slide surface with a notch groove 54 and the inside of the opening portion 41b communicates normally to the negative pressure introducing chamber 43 through this notch groove 54 and a communicating hole 55.

The inner peripheral wall of the housing 40 in the intermediate portion between the change-over chamber 44 and the valve chamber 45 is formed integrally with a valve seat 56. And when the slide sleeve 41 is slided in the direction of arrow d in FIG. 3, a seat portion 57 is pressed against the valve seat 56 while the opening portion 41b is opened.

The brake booster 1 and the change-over device 30 are constituted as mentioned above, and negative pressure produced in an intake manifold of an engine not shown is introduced into the constant pressure chamber 5 through a connecting pipe 58. And when the control rod 18 is moved forward in the direction of arrow e in FIG. 1, the vacuum valve 14 is closed while the atmospheric valve 13 is opened. Thus, the atmospheric air passing through the air filter 15 is introduced into the variable pressure chamber 6 so that the power piston 7 is driven by the differential pressure between the constant pressure chamber 5 and the variable pressure chamber 6.

Also, the end face 11a of the relay rod 11 then abuts against the reaction disk 10 so that reaction corresponding to braking force is transmitted to the control rod 18.

While said operational situation is similar to that of prior brake booster, a large feature that a force magnifying ratio is to be simply increased or decreased by the operation of the knob 52 is provided in the brake booster 1 according to the present invention.

Namely, when the slide sleeve 41 of the change-over device 30 is backward motional position shown in FIG. 2, the opening portion 41b of the slide sleeve 41 is closed in the seat portion 57 of the valve body 42 and the valve seat 56 is opened.

Thus, the pressure in the variable pressure chamber 6 of the brake booster 1 is introduced into the bellows chamber 25 through the valve chamber 45 and the change-over chamber 44 of the change-over device 30 so that the push rod 16 is urged in the direction of arrow b in FIG. 1 by the pressure in the bellows chamber 25. Accordingly, the output of the push rod 16 is decreased by this press force to reduce the force magnifying ratio of the brake booster 1.

Next, when the knob 52 of the change-over device 30 is pulled in the direction of arrow c as shown in FIG. 3 to move forward the slide sleeve 41 in the direction of arrow d, the valve seat 56 is closed by a seat portion 57 of the valve body 42 while the opening portion 41b of the slide sleeve 41 is opened.

As a result, the pressure in the constant pressure chamber 5 of the brake booster 1 is introduced into the bellows chamber 25 through the negative pressure introducing chamber 43, the communicating hole 55, the notch groove 54 and the change-over chamber 44 so that said press force acting on the push rod 16 in the direction of arrow b shown in FIG. 1 is released. Thus, the output of the push rod 16 is increased by the press force to increase the force magnifying ratio of the brake booster 1.

Since the force magnifying ratio of the brake booster 1 is thus simply increased or decreased by the operation of the knob 52 of the change-over device 30, a desired force magnifying ratio corresponding to the live load of the vehicle is to be selected.

Figure 4:
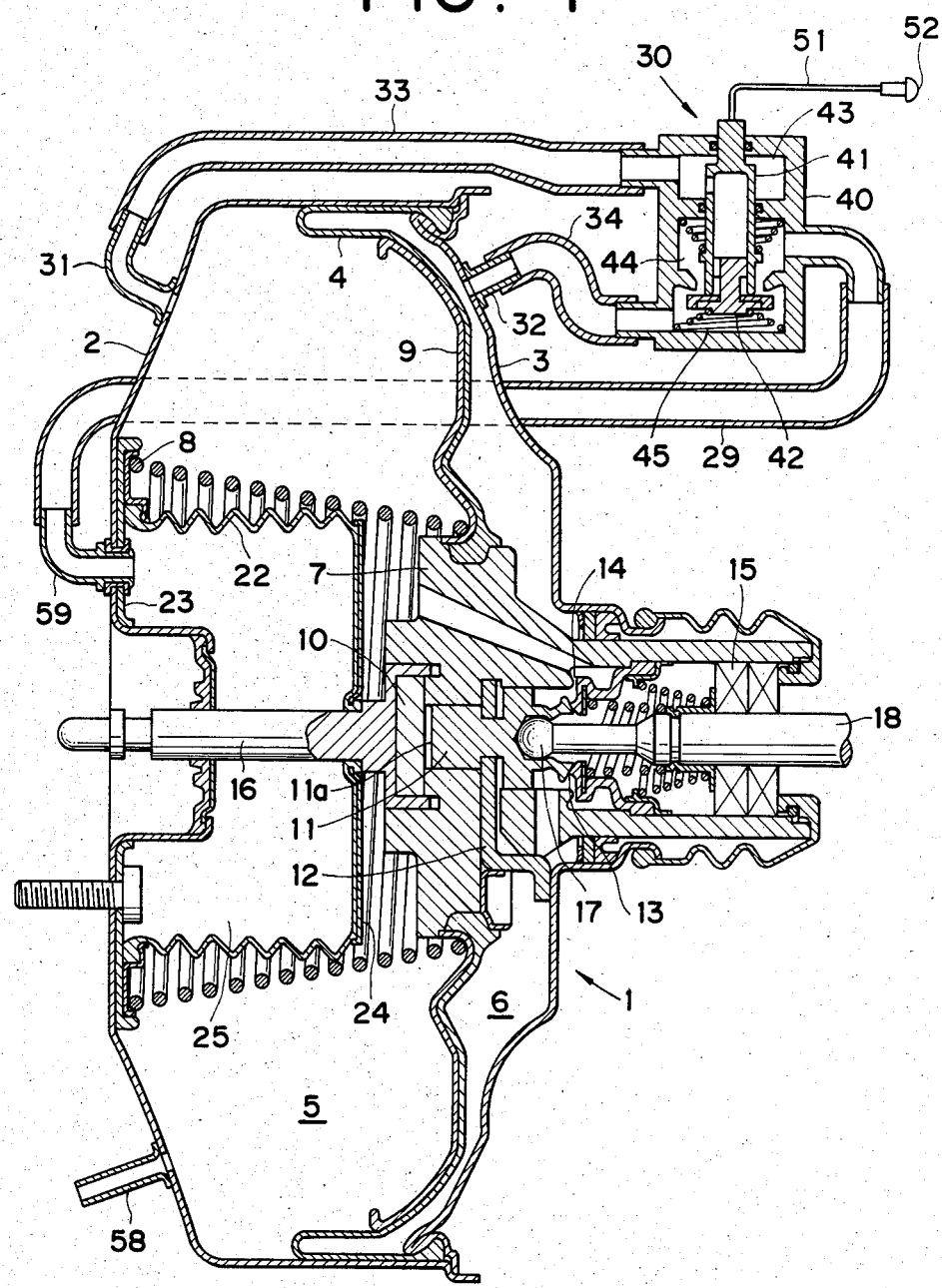
FIG. 4 is a longitudinal cross-sectional view showing the brake booster and the change-over device of force magnifying ratio in a modification of the first embodiment of the present invention.

Further, while in said embodiment the bellows chamber 25 is connected to the change-over device 30 by the use of the spiral pipe 26, they may be interconnected by mounting a connecting pipe 59 on the housing 2 as shown in FIG. 4.

Next will be described a second embodiment of the present invention with reference to FIGS. 5 to 8. While this embodiment uses a pressure regulator 63 in place of the change-over device 30 shown in FIG. 4, the construction of the brake booster 1 is similar to that of said first embodiment. Thus, hereinafter will be described the pressure regulator 63, and the description of the brake booster 1 is omitted by designating the same parts with the same symbols as the those of the first embodiment.

Figure 5:
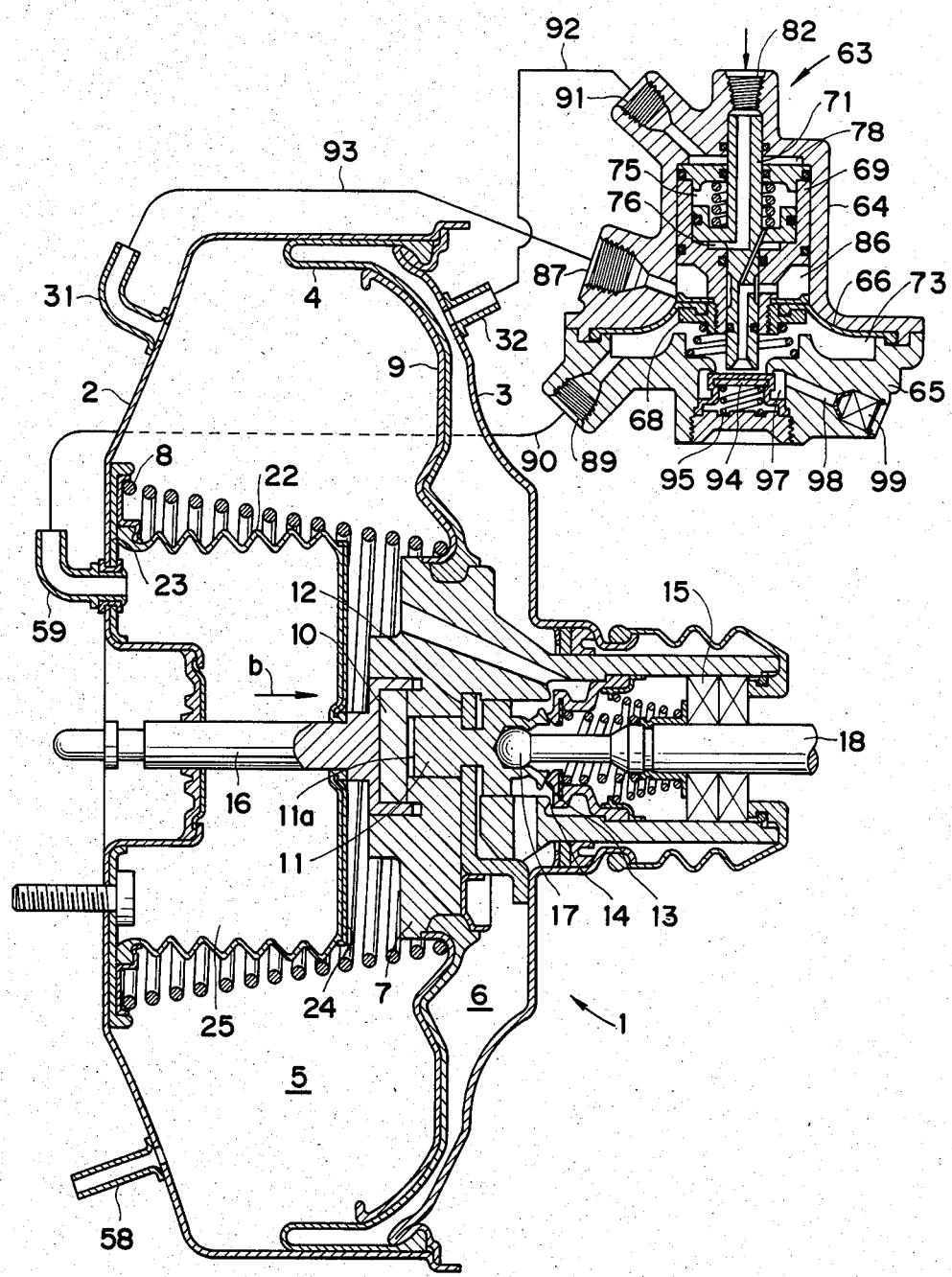
Figure 6:
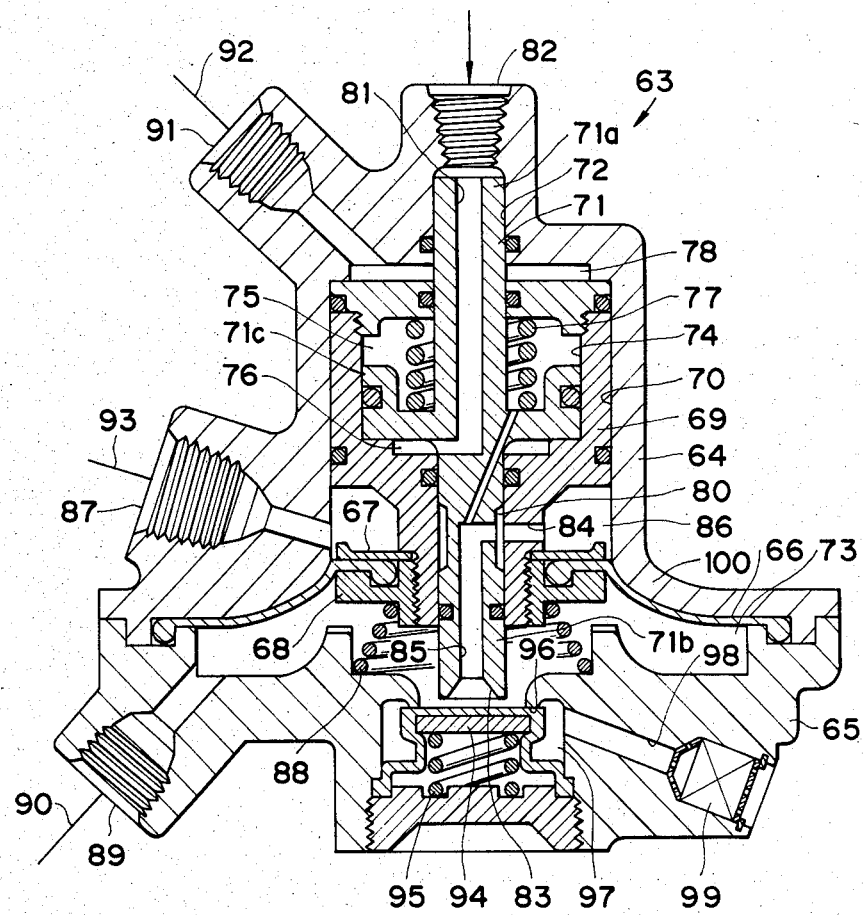

This pressure regulator 63 is constructed from housing 64, 65 fitting each other as shown in FIGS. 5 and 6. And the outer periphery of a diaphragm 66 is fixedly sandwiched between the fit surfaces of these housings 64, 65.

The inner periphery of the diaphragm 66 is secured fixedly to the outer periphery of one end of a first piston 69 by a carrier plate 67 and a nut 68. This first piston 69 is slidably fitted in a cylinder bore 70 within the housing 64.

And at both front and rear sides (both upper and lower sides in FIGS. 5 and 6) of the first piston 69 are respectively formed a pressure regulating chamber 73 and a pressure indicating chamber 78. The pressure regulating chamber 73 is connected to the bellows chamber 25 of the brake booster 1 through a pipe path 90 connected to a connecting port 89. Also, the pressure indicating chamber 78 is connected to the variable pressure chamber 6 through a pipe path 92 connected to a connecting port 91.

In the interior of the first piston 69 is fitted a second piston 71 axially slidably. One end 71a of the second piston 71 is slidably inserted into an insertion hole 72 in the housing 64 and the other end 71b projects into the pressure regulating chamber 73.

The intermediate portion 71c of the second piston 71 is slidably fitted in a cylinder bore 74 formed in the first piston 69. And the interior of the cylinder bore 74 is divided into a spring chamber 75 and a pressure chamber 76 by the intermediate portion 71c. And the second piston 71 is normally urged toward the pressure regulating chamber 73 side by a strong spring 77 housed in the spring chamber 75.

In the interior of the second piston 71 is formed a communicating hole 81 from one end 71a to the intermediate portion 71c of the second piston. The pressure chamber 76 communicates to a pressure supplying port 82 through the communicating hole 81. Also the other end 71b of the second piston 71 is formed in the end face with a suction port 83. This suction port 83 communicates to a communicating chamber 86 formed around the outer periphery of the first piston through paths 84, 85 formed respectively in the first and second pistons 69, 71. This communicating chamber 86 is further connected to the constant pressure chamber 5 of the brake booster 1 through a pipe path 93 connected to a constant pressure introducing port 87.

Further, a recess 80 is formed in the boundary between the paths 84, 85 so that communication between the paths 84, 85 is not interrupted even if the first and second pistons 69, 71 slide relative to each other.

A return spring 88 is disposed in the pressure regulating chamber 73 to urge normally the first piston 69 toward the pressure indicating chamber 78 side. Also, in front of (beneath in FIGS. 5 and 6) the suction port 83 of the second piston 71 is disposed a valve body 94 adjacent the pressure regulating chamber 73 and pressed against a valve seat 96 normally by a spring 95.

A valve chamber 97 in which the valve body 94 is housed communicates to the outside through an atmospheric air introducing path 98. And when the other end 71b of the second piston 71 presses the valve body 94 to open the valve seat 96, the atmospheric air passing through an air filter 99 is introduced into the pressure regulating chamber 73.

The pressure regulator 63 thus constituted is to optimize the force magnifying ratio of the brake booster 1 by supplying compressed air proportional to the vehicle weight to the pressure supply port 82 for example.

Namely, while the pressure supplied to the pressure supply port 82 is introduced into the pressure chamber 76 through the communicating hole 81, the second piston 71 is not to move forward against the spring 77 when the pressure is low and thereby the length of the other end 71b of the second piston 71 projecting into the pressure regulating chamber 73 is elongated.

Figure 7:
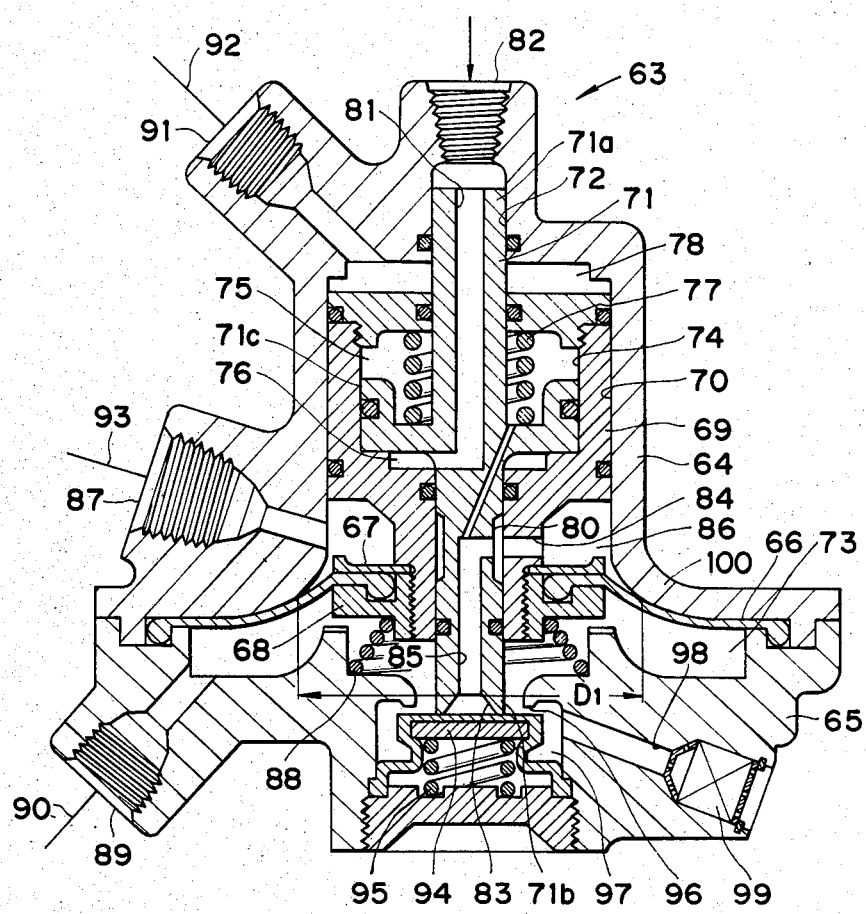

When the control rod 18 of the brake booster 1 is moved forward under that condition, the pressure in the variable pressure chamber 6 of the brake booster 1 is introduced into the pressure indicating chamber 78 of the pressure regulator 63 through the pipe path 92. Since, at that time, the negative pressure in the constant pressure chamber 5 of the brake booster 1 is introduced into the pressure regulating chamber 73 through the suction port 83, the first and second pistons 69, 71 are moved forward integrally against the return spring 88 by the pressure in the pressure indicating chamber 78 as shown in FIG. 7.

As a result, the other end 71b of the second piston 71 abuts against and presses the valve body 94 against the spring 95. Thus, while the suction port 83 is closed by the valve body 94, the valve seat 96 is opened. Accordingly, the atmospheric air passing through the air filter 99 is introduced into the pressure regulating chamber 73 to increase the pressure in the pressure regulating chamber 73. When the pressure in the pressure regulating chamber 73 is increased the first and second pistons 69, 71 move somewhat backward integrally and then stop when the pressure in the pressure indicating chamber 78 and that in the pressure regulating chamber 73 are balanced with each other.

The forward stroke of the first piston 69 then is relatively small since the other end 71b of the second piston 71 projects long, so that the diameter $D_1$ (aparture) of the diaphragm 66 spaced from an arcuate wall 100 of the housing 65 is relatively small.

Thus, the pressure in the pressure regulating chamber 73 under said balanced condition is somewhat lower than that in the pressure indicating chamber 78 and considerably higher than that in the constant pressure chamber 5. And since this pressure is introduced into the bellows chamber 25 through the pipe path 90, a relatively large press force acts on the push rod 16 in the direction of arrow b in FIG. 5. Thus, the output of the push rod 16 is decreased by the press force to reduce the force magnifying ratio of the brake booster 1.

On the contrary, when high pressure is supplied to the pressure supply port 82, the second piston 71 is moved forward against the spring 77 by the pressure in the pressure chamber 76. Thus, the length of the other end 71b of the second piston 71 projecting into the pressure regulating chamber 73 is shortened.

Figure 8:
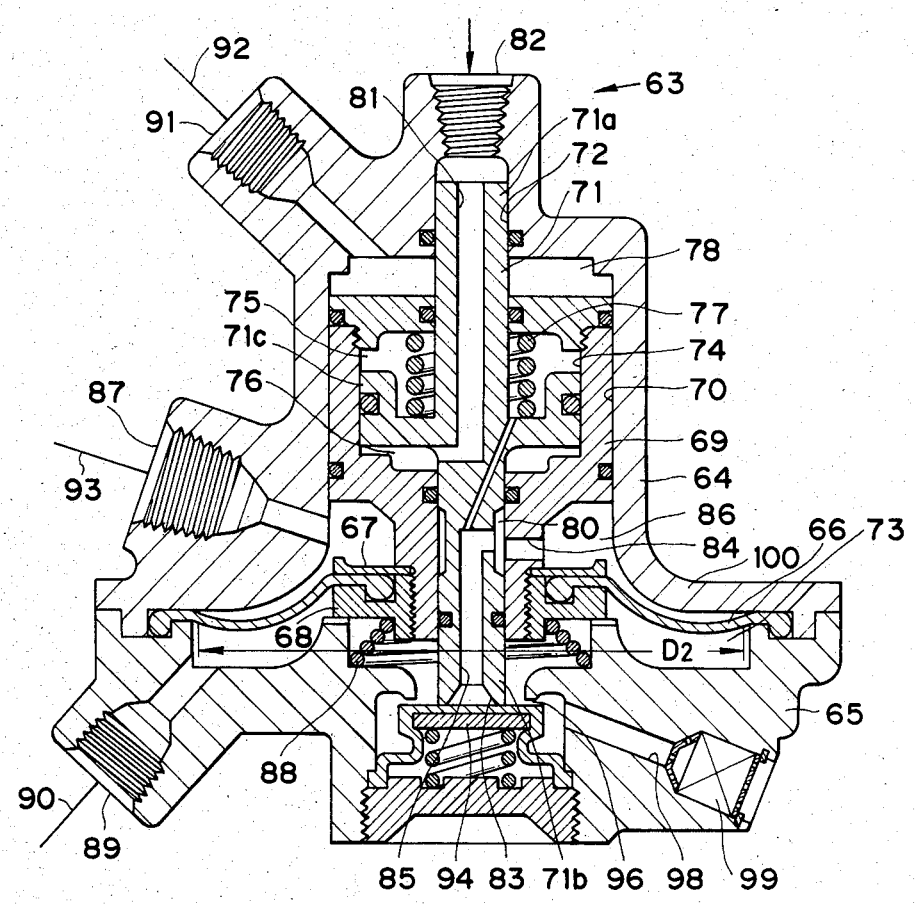

And when the control rod 18 of the brake booster 1 is moved forward under such condition, the first and second pistons 69, 71 are moved forward integrally by the pressure in the pressure indicating chamber 78 against the return spring 88 as shown in FIG. 8 and then stop when the pressure in the pressure indicating chamber 78 is balanced with that in the pressure regulating chamber 73 in the same manner as mentioned above.

The forward stroke of the first piston 69 then is relatively large since the projecting length of the other end 71b of the second piston 71 is shortened, so that the aperture $D_2$ of the diaphragm 66 is relatively enlarged.

Thus, the pressure in the pressure regulating chamber 73 under said balanced condition is considerably lower than that in the pressure indicating chamber 78 and approaches that in the constant pressure chamber 5 of the brake booster 1. And since this pressure is introduced into the bellows chamber 25 through the pipe path 90 the press force acting on the push rod 16 in the direction of arrow b in FIG. 5 is reduced. Thus, the output of the push rod 16 is increased by this press force to increase the force magnifying ratio.

Thus, the pressure regulator 63 is to increase or decrease adjustably continuously the force magnifying ratio of the brake booster 1 in proportion to an amount of force supplied to the pressure supply port 82. Accordingly when high pressure air proportional to the vehicle weight for example is supplied to the pressure supply port 82, the identical braking deceleration is to be always ensured by a certain pedalling force of brake pedal irrespective of the vehicle weight.

Figure 9:
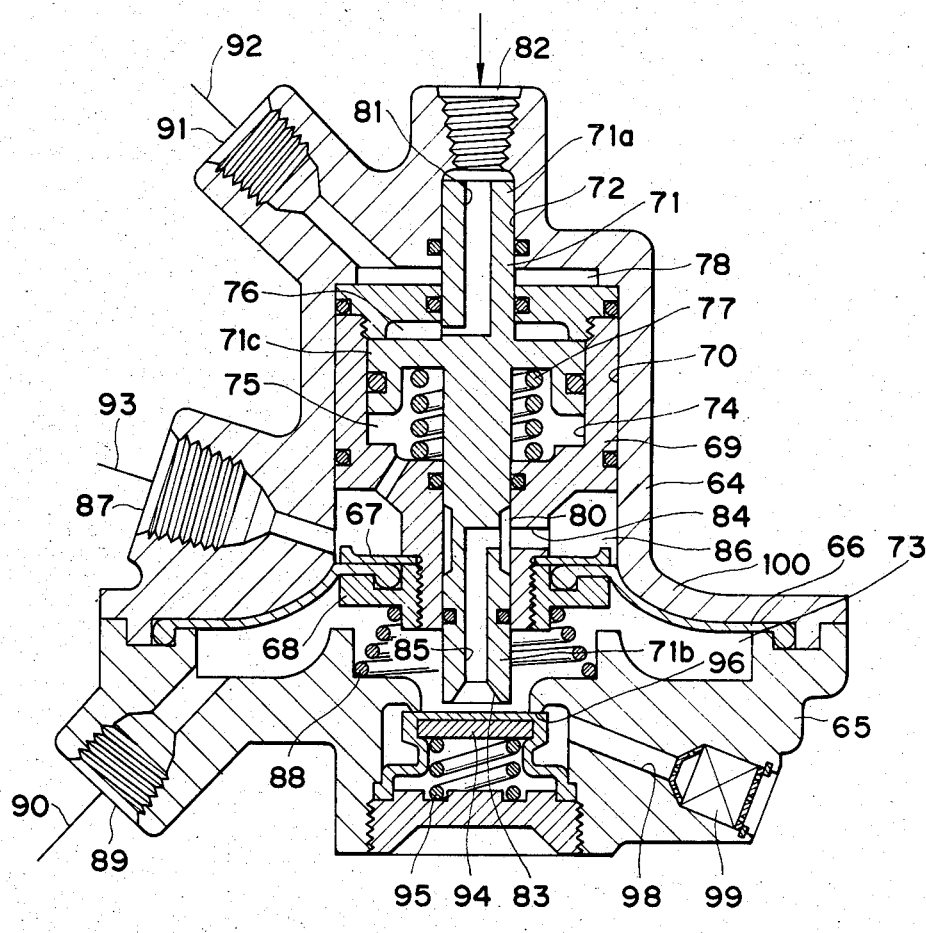
FIG. 9 is a longitudinal cross-sectional view showing the pressure regulator in the modification of the second embodiment of the present invention.

Further, while compressed air is supplied to the pressure supply port 82 in said embodiment, the spring chamber 75 and the pressure chamber 76 may be arranged reversely as shown in FIG. 9 to supply vacuum pressure proportional to the vehicle weight to the pressure supply port 82.

Next will be described a third embodiment of the present invention with reference to FIG. 10. In this embodiment, a further pressure regulator 110 is used in place of the change-over device 30 shown in FIG. 4. The construction of the brake booster 1, however is the same as that in said first embodiment. Thus, hereinafter will be described the pressure regulator 110 and the description of the brake booster 1 is omitted by designating the same parts with the same symbols as those in the first embodiment.

Figure 10:
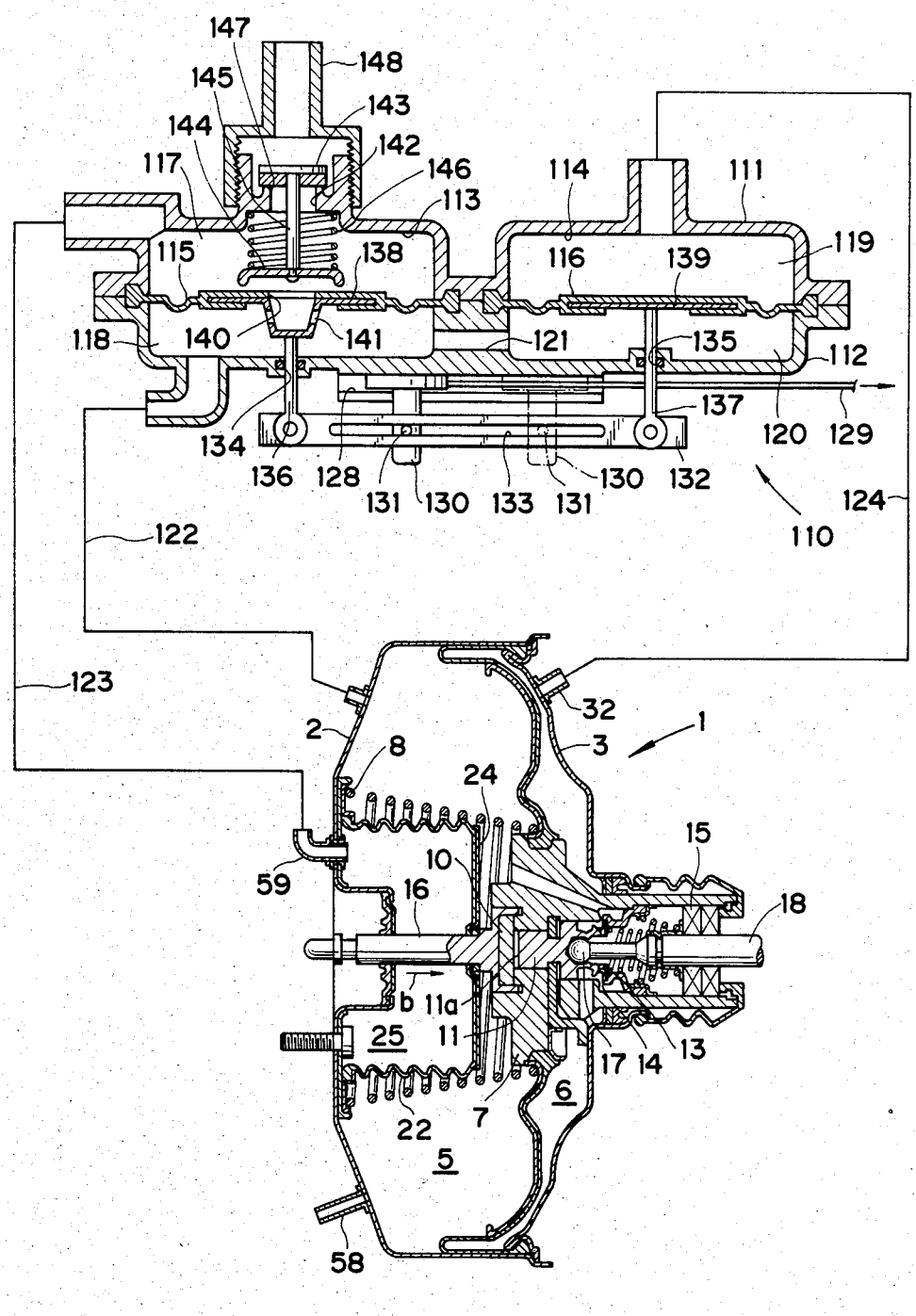
FIG. 10 is a longitudinal cross-sectional view showing the brake booster and the pressure regulator in a third embodiment of the present invention.

This pressure regulator 110, as shown in FIG. 10, is constituted from a pair of upper and lower housings 111, 112 fitting each other from above and below, in which are formed a pair of left and right diaphragm chambers 113, 114.

In the pair of the diaphragm chambers 113, 114 are arranged respectively a pair of diaphragms 115, 116 fixedly sandwiched on the outer peripheries between the fitting surfaces of a pair of housings 111, 112. And on both upper and lower sides of one diaphragm 115 are defined and formed respectively a pressure regulating chamber 117 and a negative pressure chamber 118, and on both upper and lower sides of the other diaphragm 116 are defined and formed respectively a pressure indicating chamber 119 and a negative pressure chamber 120.

And the negative pressure chambers 118, 120 communicate to each other through a communicating hole 121 and one negative pressure chamber 118 is connected to the constant pressure chamber 5 of the brake booster 1 through a pipe path 122. Also, the pressure regulating chamber 117 is connected to the bellows chamber 25 through a pipe path 123 and the pressure indicating chamber 119 communicates to the variable pressure chamber 6 through a pipe path 124.

On the other hand, the lower side housing 112 is formed on the outer wall surface integrally with a guide groove 128 extending leftward and rightward. Into the guide groove 128 is slidably inserted the head of a slider 130 connected to a rod 129, and a fulcrum pin 131 formed integrally on the slider 130 is slidably inserted into a slot 133 in a lever 132.

Also, on the wall surface of the housing 112 defining the negative pressure chambers 118, 120 are formed respectively a pair of left and right insertion holes 134, 135 into which are slidably inserted a pair of slide rods 136, 137.

One ends of the pair of slide rods 136, 137 are pivotably coupled with both left and right ends of said lever 132 respectively and the other ends of the pair of slide rods 136, 137 are fixedly secured respectively to support plates 138, 139 mounted on a pair of the diaphragms 115, 116.

Further, communicating holes 140, 141 affording communication between the pressure regulating chamber 117 and the negative pressure chamber 118 are formed in the central portion of one diaphragm 115 and the support plate 138.

In the wall surface of the housing 111 defining the pressure regulating chamber 117 is formed an atmospheric air introducing port 142. Outside this atmospheric air introducing port 142 is arranged an atmospheric valve 143 which is connected to a pressure regulating valve 144 disposed above the communicating hole 140 of the diaphragm 115 through a connecting rod 145.

The pressure regulating valve 144 is urged by a spring 146 toward the diaphragm 115 side and the atmospheric valve 143 is normally pressed against a valve seat 147 of the atmospheric air introducing port 142 by the spring 146 to close said port 142. Further, a suction pipe 148 is mounted on the outside of said port 142.

The pressure regulator 110 thus constituted is to adjustably increase or decrease freely the force magnifying ratio of the brake booster 1 by sliding left and right the slider 130 with the operation of the rod 129 in FIG. 10.

Namely, when the force magnifying ratio is reduced, the slider 130 is moved to the left side as shown in FIG. 10. And when the control rod 18 of the brake booster 1 is moved forward under such condition, pressure in the atmospheric pressure chamber 6 is introduced into the pressure indicating chamber 119 of the pressure regulator 110. The diaphragm 116 is urged toward the negative pressure chamber 120 side by this pressure.

Thus, the lever 132 pivots about the fulcrum pin 131 slightly clockwise in FIG. 10 and the other diaphragm 115 is pressed toward the pressure regulating chamber 117 side by the support plate 138.

As a result, the diaphragm 115 abuts against the pressure regulating valve 144 to close the communicating hole 140, while the atmospheric valve 143 is opened against the spring 146. Thus the atmospheric air is introduced into the pressure regulating chamber 117 through the suction pipe 148. And when pressure in the pressure regulating chamber 117 is increased, the diaphragm 115 is again moved toward the negative pressure chamber 118 side and stops when the pressure in the pressure regulating chamber 117 and the negative pressure chamber 118 and the press force of the slide rod 136 are balanced with each other.

The press force of the slide rod 136 at that time is relatively largely intensified by lever action of the lever 132 and the pressure in the pressure regulating chamber 117 is raised to balance with such force. And since this pressure is introduced into the bellows chamber 25 through the pipe path 123, a relatively large press force acts on the push rod 16 in the direction of arrow b in FIG. 10. Thus, the output of the push rod 16 decreases by this press force to reduce the force magnifying ratio of the brake booster 1.

On the contrary, when the force magnifying ratio is increased, the slider 130 is moved to the right side as shown by the chain line in FIG. 10. And when the control rod 18 of the brake booster 1 is moved forward under such condition, the lever 132 pivots somewhat clockwise in FIG. 10 about the fulcrum pin 131 in the same manner as above mentioned so that the diaphragm 115 stops when the pressure in the pressure regulating chamber 117 and the negative pressure chamber 118 balances with the press force of the slide rod 136.

The press force of the slide rod 136 at that time is relatively small since the fulcrum pin 131 is moved to the right side, and the pressure in the pressure regulating chamber 117 is lowered to balance with that force. And since that force is introduced into the bellows chamber 25 through the pipe path 123, the press force acting on the push rod 16 in the direction of arrow b in FIG. 10 is reduced. Thus, the output of the push rod 16 increases by this press force to increase the force magnifying ratio of the brake booster 1.

Thus, the pressure regulator 110 is to continuously adjustably increase or decrease the force magnifying ratio of the brake booster 1 by moving the slider 130. Accordingly, when said slider 130 is displaced to the left side in FIG. 10 in the light vehicle weight for example and to the right side in the heavy vehicle weight, the identical braking deceleration is to be ensured always with a certain pedalling force of brake pedal irrespective of light or heavy vehicle weight.

Further, the rod 129 may be manually operated while it may be automatically operated by utilizing the vehicle height change caused by the change in the vehicle weight, pneumatic or hydraulic pressure in the vehicle height regulator, etc.

Further, while the present invention has been described with reference to the force magnifying device for introducing negative pressure and the atmospheric air respectively into the constant pressure chamber 5 and the variable pressure chamber 6, the atmospheric air or negative pressure and compressed air may be, of course, introduced respectively into the constant pressure chamber 5 and the variable pressure chamber 6 to be applied to the force magnifying device utilizing the differential force.

While the embodiments of the present invention have been mentioned above it will be appreciated that the present invention be not limited to the construction shown in said embodiments, but may be variously modified.

As above mentioned, according to the present invention a hollow expansion body is disposed in the constant pressure chamber, and the force magnifying ratio of the brake booster is changed by adjusting the internal pressure in the hollow expansion body. Thus, the identical braking deceleration is to be ensured always by a certain pedalling force on the brake pedal irrespective of an amount of the vehicle weight when fluid pressure inversely proportional to the amount of the vehicle weight for example is introduced into the interior of said hollow expansion body.

Also, said hollow expansion body is to be easily applied to prior brake boosters so that variable force magnifying ratio type brake boosters are to be produced by low cost.

What is claimed is:

1. A brake booster comprising a housing (2,3) defining an interior space, diaphragm means (4) connected to said housing in said interior space and dividing said interior space into a constant pressure chamber (5) and a variable pressure chamber (6), a power piston (7) movable in said housing and connected to said diaphragm means for moving said diaphragm means in said space, a push rod (16) for pressing a master cylinder of a brake, reaction means (10) operatively engaged between said power piston and said push rod for transmitting pushing forces from said power piston to said push rod, a vacuum valve (13) in said power piston for opening and closing communication between said constant pressure chamber and said variable pressure chamber, an open air valve (14) in said power piston for opening and closing communication between said variable pressure chamber and the ambient atmosphere, a relay rod (11) movably mounted in said housing and operatively connected to said vacuum valve and said open air valve for opening and closing said vacuum and open air valves with movement of said relay rod, said relay rod having one end which is engageable against said push rod through said reaction means, an operating rod (18) adapted to be pushed by movement of a brake pedal of a brake, said operating rod being engaged with said relay rod for moving said relay rod, a hollow expansion body (22) disposed in said constant pressure chamber and connected between said housing and said push rod, said expansion body defining an expansion chamber (25) and being expandable and contractable in an axial direction of movement of said push rod in said housing, and pressure valving means connected to said housing and between said expansion chamber, said constant pressure chamber and said variable pressure chamber, said pressure valving means having a plurality of positions for establishing varied communication between said expansion chamber and at least one of said constant pressure chamber and said variable pressure chamber so that an inner pressure of said expansion chamber can be changed dependent on a pressure in one of said constant pressure chamber and said variable pressure pressure chamber to change a boosting ratio of said brake booster, said valving means positioned externally of said housing space.

2. A brake booster as defined in claim 1, wherein said pressure valving means comprises a manually operable change-over valve having a valve member movable between a first position for communicating said expansion chamber with said variable pressure chamber, to a second position for communicating said expansion chamber with said constant pressure chamber.

3. A brake booster according to claim 1, wherein said pressure valving means comprises a pressure regulator for varying a relative amount of communication between said expansion chamber and said constant pressure and variable pressure chambers, said regulator having a movable member for varying said communication and a pressure connection connected to said regulator for moving said movable member in response to a pressure corresponding to a vehicle weight of a vehicle using said brake booster.

4. A brake booster as defined in claim 1, wherein said hollow expansion body comprises a flexible bellows.

5. A brake booster as defined in claim 1 or 4, wherein pressure in the constant or variable pressure chambers is selectively introduced into the interior of the hollow expansion body by a change-over device forming said valving means to change the force magnifying ratio in two high and low steps.

6. A brake booster as defined in claim 1 or 4, wherein the pressure in the constant pressure chamber is changed by a pressure regulator forming said valving means and introduced into the interior of the hollow expansion body to continuously change the force magnifying ratio.

7. A brake booster as defined in claim 6, wherein the force magnifying ratio is changed in proportion to the vehicle weight to ensure a certain braking deceleration with a certain pedalling force on a brake pedal.

8. A brake booster as defined in claim 7, wherein the pressure regulator is automatically adjusted by pneumatic or hydraulic pressure proportional to the vehicle weight.

* * * * *